UNITED STATES PATENT OFFICE.

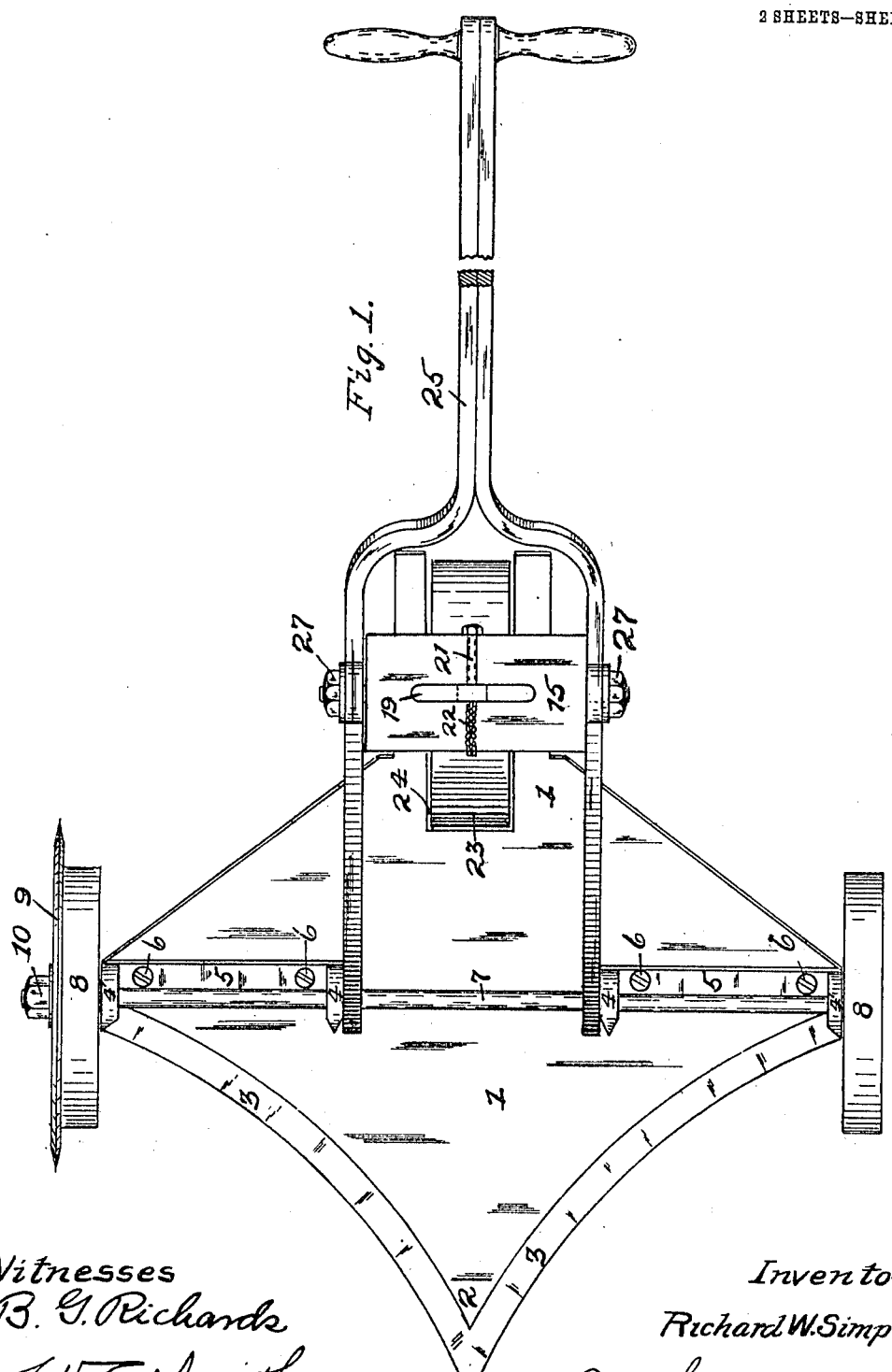

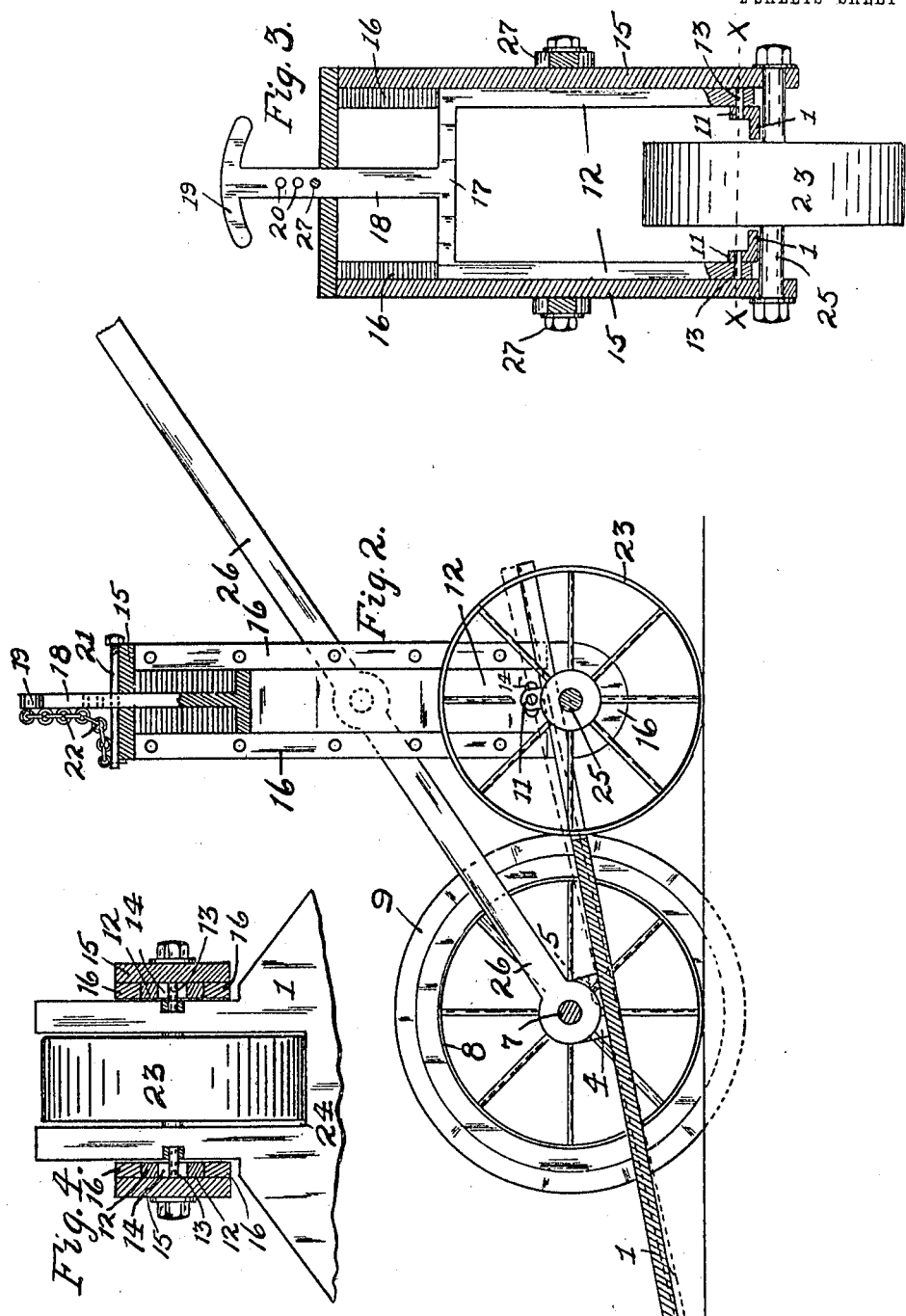

RICHARD W. SIMPSON, OF CHICAGO, ILLINOIS, ASSIGNOR OF ONE-HALF TO ELI McDANIELS, OF CHICAGO, ILLINOIS.

CULTIVATOR.

949,383.  Specification of Letters Patent.  Patented Feb. 15, 1910.

Application filed May 21, 1909. Serial No. 497,439.

*To all whom it may concern:*

Be it known that I, RICHARD W. SIMPSON, a citizen of the United States, residing at Chicago, county of Cook, and State of Illinois, have invented certain new and useful Improvements in Cultivators, of which the following is a specification.

My invention relates to improvements in cultivators especially adapted for use in cultivating strawberries and has for its object the production of a cultivator of improved construction and duration.

My invention consists in the combination and arrangement of parts hereinafter described and claimed.

In the drawings, Figure 1 is a top plan view of a cultivator embodying my invention, Fig. 2, a longitudinal medial section of Fig. 1 with parts shown in elevation, Fig. 3, a section through the guide frame of the cultivator, and Fig. 4, a section on line X—X of Fig. 3 with parts shown in top plan view.

The cultivator comprises a substantially flat blade 1 having a pointed nose 2, the ends and forward edges of the blade being sharpened or beveled as at 3. Suspending lugs 4 and 4' carried by plates 5 are secured thereto by means of screws 6 just behind the sharpened edges 3. An axle 7 is mounted in lugs 4 and 4' and carries thereon supporting wheels 8. An edged disk 9 is removably secured to one of the wheels 8 by means of a nut 10. At the rear, the blade 1 is provided with two lugs 11 connected with slides 12 by means of pins 13 taking into slots 14 in said slides. The slides 12 are supported in a frame 15 between guide strips 16. At their tops the slides 12 are connected together by the cross piece 17 which carries a bar 18 projecting through a slot in the top of the frame 16 and provided with a handle 19. At suitable intervals, the bar 18 is provided with holes 20 adapted to receive a bolt 21 which engaging with the top of the frame 16 serves to hold the slides 12 at the elevation corresponding to the hole in which the bolt is placed. A chain 22 is secured to the bolt 21 and to the handle 19 to prevent losing the same. The frame 16 is supported by a wheel 23 in the rear of blade 1 and rotatably secured to frame 16 by means of axle 25. A handle 26 is secured to the frame 16 by means of a nut 27 and also takes over the axle 7 as shown. The forward edges of lugs 4 and 4' and plate 5 are beveled to permit the passage of matter over the surface of the plate.

In use, it is designed to run this cultivator between the rows of strawberry plants, the disk 9 trimming off the runners and the blade 1 cultivating and weeding the space between. By adjusting the slides 12 to different elevations, the blade 1 may be caused to give different depths of cultivation, or be raised entirely out of operation. If desired the edged disk 9 may be removed and the cultivator used solely for cultivating and weeding.

While I have illustrated and described the preferred construction for carrying my invention into effect, this is capable of modification without departing from the spirit of the invention. I, therefore, do not wish to be limited to the exact construction set forth but wish to avail myself of such modifications and changes as come within the scope of the appended claims.

Having described my invention what I claim as new and desire to secure by Letters Patent is:

1. In a cultivator, the combination of a cultivating blade, a pair of forward wheels supporting a front axle, means for pivotally suspending said blade from said axle, a rear wheel, a guide frame supported by the rear wheel, a slidable guide in said guide frame, a slot and pin connection between the blade and the guide, means for adjustably securing said slide in the guide, and a handle for the cultivator, substantially as described.

2. In a cultivator, the combination of a cultivating blade, a pair of forward wheels supporting a front axle, means for pivotally suspending said blade from said axle, a rear wheel, a guide frame supported by the rear wheel, a slidable guide in said guide frame, a slot and pin connection between the blade and the guide, and a handle secured to the guide frame and the front axle, substantially as described.

3. In a cultivator, the combination of a substantially flat cultivating blade provided with a pointed nose and sharpened forward edges, a pair of forward wheels supporting a front axle, means for pivotally suspending said blade from said axle behind the nose of the blade, a rear wheel operating in a slot in the blade, a guide frame supported by the rear wheel, a slidable guide in said guide frame and slot and pin connection between said blade and said guide, means for adjustably securing said slide in the guide, and a handle secured to the guide frame, and the front axle, substantially as described.

4. In a cultivator, the combination of a substantially flat cultivating blade provided with a pointed nose and sharpened forward edges, a pair of forward wheels supporting a front axle, means for pivotally suspending said blade from said axle behind the nose of the blade, a rear wheel operating in a slot in the blade, a guide frame supported by the rear wheel, a slidable guide in said guide frame, a slot and pin connection between said blade and said guide, means for adjustably securing said slide in the guide, an edged disk removably secured to one of the front wheels, and a handle secured to the guide frame and to the front axle, substantially as described.

In testimony whereof I have signed my name to this specification in the presence of two subscribing witnesses.

RICHARD W. SIMPSON.

Witnesses:
   JOSHUA R. H. POTTS,
   HELEN F. LILLIS.